US011062389B2

(12) United States Patent
Sarir et al.

(10) Patent No.: US 11,062,389 B2
(45) Date of Patent: Jul. 13, 2021

(54) CONFIGURATION OF DATA TRANSFER RECIPIENT

(71) Applicant: The Toronto-Dominion Bank, Toronto (CA)

(72) Inventors: Nasim Sarir, Thornhill (CA); Steven Gervais, Newmarket (CA); Christopher Mark Jones, Villanova, PA (US); Jonathan Joseph Prendergast, West Chester, PA (US); John William Thomas, Kennett Square, PA (US); Michael Thomas DeLaveaga, Newark, DE (US)

(73) Assignee: The Toronto-Dominion Bank, Toronto (CA)

( * ) Notice: Subject to any disclaimer, the term of this patent is extended or adjusted under 35 U.S.C. 154(b) by 192 days.

(21) Appl. No.: 16/368,944

(22) Filed: Mar. 29, 2019

(65) Prior Publication Data
US 2020/0143462 A1 May 7, 2020

Related U.S. Application Data

(60) Provisional application No. 62/755,792, filed on Nov. 5, 2018.

(51) Int. Cl.
*G06Q 40/06* (2012.01)
*G06Q 40/02* (2012.01)
(Continued)

(52) U.S. Cl.
CPC ........... *G06Q 40/02* (2013.01); *G06Q 20/102* (2013.01); *G06Q 20/108* (2013.01);
(Continued)

(58) Field of Classification Search
CPC .... C06Q 40/02; C06Q 20/108; G06Q 20/145; G06Q 20/3221; G06Q 20/3223; G06Q 30/04; G06Q 20/108
See application file for complete search history.

(56) References Cited

U.S. PATENT DOCUMENTS 8,290,835 B2   10/2012  Homer et al.
10,332,201 B1*  6/2019  Kunz ............... G06Q 40/02
(Continued)

FOREIGN PATENT DOCUMENTS

WO   WO2008005018   1/2008

OTHER PUBLICATIONS

Antonella et al.; Introducing ATMs in India: a contexual inquiry; Nov. 3, 2003; Elsevier, web, 30-39 (Year: 2003).*

*Primary Examiner* — I Jung Liu
(74) *Attorney, Agent, or Firm* — Rowand LLP

(57) ABSTRACT

A method may include: sending a first signal representing a message identifying an entity from a server computer system to a resource usage tracking server; in response to the message, receiving, from the resource usage tracking server, a second signal representing historical resource usage data for the entity; identifying a first data transfer recipient associated with the historical resource usage data for the entity by using a database of supported data transfer recipients; sending a third signal, the third signal causing a client device associated with the entity to display a selectable option for data transfer to the identified first data transfer recipient; receiving a fourth signal, the fourth signal indicating selection of the selectable option for data transfer to the identified first data transfer recipient; and in response to receiving the fourth signal, configuring an account associated with the entity based on the first data transfer recipient.

14 Claims, 8 Drawing Sheets

(51) Int. Cl.
   *G06Q 20/10* (2012.01)
   *G06Q 20/32* (2012.01)
   *G06Q 20/14* (2012.01)
   *G06Q 30/04* (2012.01)

(52) U.S. Cl.
   CPC ....... *G06Q 20/145* (2013.01); *G06Q 20/3221* (2013.01); *G06Q 20/3223* (2013.01); *G06Q 30/04* (2013.01)

(56) References Cited

U.S. PATENT DOCUMENTS

| | | |
|---|---|---|
| 2003/0105710 A1* | 6/2003 | Barbara ................. G06Q 40/02 705/39 |
| 2004/0095237 A1* | 5/2004 | Chen ................... H02J 13/0086 340/506 |
| 2008/0010192 A1 | 1/2008 | Rackley et al. |
| 2014/0279453 A1 | 9/2014 | Belchee et al. |
| 2014/0358786 A1 | 12/2014 | Van Heerden et al. |
| 2015/0262179 A1 | 9/2015 | Zhang |
| 2015/0379487 A1 | 12/2015 | Stewart et al. |
| 2017/0124558 A1 | 5/2017 | Molnar et al. |
| 2017/0308875 A1 | 10/2017 | O'Regan et al. |
| 2017/0308892 A1 | 10/2017 | deOliveira et al. |
| 2018/0268414 A1* | 9/2018 | Chung ................. G06Q 20/206 |

* cited by examiner

CONFIGURATION OF DATA TRANSFER RECIPIENT

TECHNICAL FIELD

The present disclosure relates to data transfer configuration systems and methods and, more particularly, to methods and systems for configuring data transfers over a network.

BACKGROUND

Data transfers may sometimes transfer data, such as data representing a storage of value, between accounts. Configuring such data transfers may be difficult and prone to error since data transfer configuration often relies on the manual input of data. For example, in order to initiate a data transfer, input of identification information of a recipient and/or other information may be required. Manual entry of such information may, for example, cause a data transfer to be sent to an unintended data transfer recipient if such information is improperly inputted.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
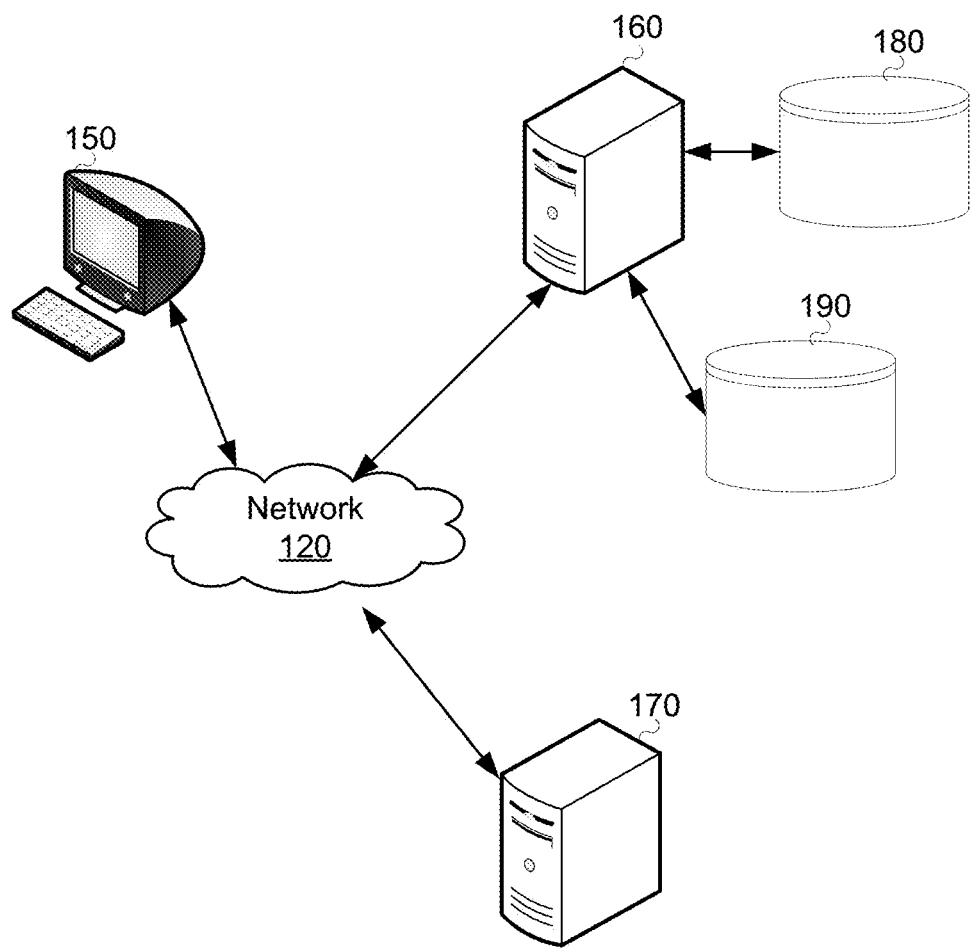
FIG. 1 is a schematic operation diagram illustrating an operating environment of an example embodiment.

Data transfer configuration systems and methods are described. Such systems and methods may, for example, be used to setup data transfers to new data transfer recipients. Conveniently, such setup may allow a new data transfer recipient to be automatically identified without requiring a data transfer initiator to input complete identification information for the new data transfer recipient. Such automatic identification may, for example, reduce the possibility of erroneous input of the data transfer recipient which could result in a data transfer to an unintended recipient. Further, such automatic identification may result in more efficient use of resources at a client device since configuration of a new data transfer recipient may be performed expediently.

In an aspect, the present application describes a server computer system. The server computer system may include a communications module, a processor coupled to the communications module and a memory storing processor-executable instructions which, when executed, configure the processor to: send, via the communications module, a first signal representing a message from the server computer system to a resource usage tracking server, the message including identification information for an entity; in response to the message, receive, via the communications module and from the resource usage tracking server, a second signal representing historical resource usage data for the entity; identifying a first data transfer recipient associated with the historical resource usage data for the entity by using a database of supported data transfer recipients; send, via the communications module, a third signal, the third signal causing a client device associated with the entity to display a selectable option for data transfer to the identified first data transfer recipient; receive, via the communications module, a fourth signal, the fourth signal indicating selection of the selectable option for data transfer to the identified first data transfer recipient; and in response to receiving the fourth signal, configure an account associated with the entity based on the first data transfer recipient.

In some implementations, the selectable option for data transfer to the identified first data transfer recipient may represent an option to add the identified first data transfer recipient as a pre-configured data transfer recipient. Configuring the account associated with the entity based on the data transfer recipient may include updating the account to permit the first data transfer recipient to be selected for receiving data transfers from the account.

In some implementations, the instructions may further configure the processor to: identify a second data transfer recipient associated with the historical resource usage data for the entity by using the database of supported data transfer recipients; and prior to sending the third signal: evaluate the first data transfer recipient and the second data transfer recipient; and select the first data transfer recipient based on the evaluation.

In some implementations, evaluating the first data transfer recipient and the second data transfer recipient may include evaluating the first data transfer recipient and the second data transfer recipient based on a location associated with the entity.

In some implementations, evaluating the first data transfer recipient and the second data transfer recipient may include evaluating the first data transfer recipient and the second data transfer recipient based on category data associated with at least one of the first data transfer recipient and the second data transfer recipient.

In some implementations, evaluating the first data transfer recipient and the second data transfer recipient based on the category data may include determining that the account has previously been configured based on a third data transfer recipient associated with a category that is also associated with the second data transfer recipient.

In some implementations, the third signal may be provided in real-time in response to receipt of the first signal.

In some implementations, the instructions may configure the processor to extract an account identifier that identifies an account at the first data transfer recipient from the historical resource usage data. Configuring an account associated with the entity based on the first data transfer recipient may include configuring the account based on the account identifier.

In some implementations, the account identifier may be or include a partial identifier and the instructions may further configure the processor to cause the client device to prompt for completion of the account identifier.

In some implementations, the resource usage tracking server may be or include a credit report server and the historical resource usage data may represent a credit report.

In another aspect, a method is described. The method may be performed at a server computer system. The method may include: sending a first signal representing a message from a server computer system to a resource usage tracking server, the message including identification information for an entity; in response to the message, receiving, from the resource usage tracking server, a second signal representing historical resource usage data for the entity; identifying a first data transfer recipient associated with the historical resource usage data for the entity by using a database of supported data transfer recipients; sending a third signal, the third signal causing a client device associated with the entity to display a selectable option for data transfer to the identified first data transfer recipient; receiving a fourth signal, the fourth signal indicating selection of the selectable option for data transfer to the identified first data transfer recipient; and in response to receiving the fourth signal, configuring an account associated with the entity based on the first data transfer recipient.

In some implementations, the selectable option for data transfer to the identified first data transfer recipient may represent an option to add the identified first data transfer recipient as a pre-configured data transfer recipient and configuring the account associated with the entity based on the data transfer recipient may include updating the account to permit the first data transfer recipient to be selected for receiving data transfers from the account.

In some implementations, the method may further include: identifying a second data transfer recipient associated with the historical resource usage data for the entity by using the database of supported data transfer recipients; and prior to sending the third signal: evaluating the first data transfer recipient and the second data transfer recipient; and selecting the first data transfer recipient based on the evaluation.

In some implementations, evaluating the first data transfer recipient and the second data transfer recipient may include evaluating the first data transfer recipient and the second data transfer recipient based on a location associated with the entity.

In some implementations, evaluating the first data transfer recipient and the second data transfer recipient may include evaluating the first data transfer recipient and the second data transfer recipient based on category data associated with at least one of the first data transfer recipient and the second data transfer recipient.

In some implementations, evaluating the first data transfer recipient and the second data transfer recipient based on the category data may include determining that the account has previously been configured based on a third data transfer recipient associated with a category that is also associated with the second data transfer recipient.

In some implementations, the third signal may be provided in real-time in response to receipt of the first signal.

In some implementations, the method may further include extracting an account identifier that identifies an account at the first data transfer recipient from the historical resource usage data, and configuring an account associated with the entity based on the first data transfer recipient may include configuring the account based on the account identifier.

In some implementations, the account identifier may be a partial identifier. The method may further include causing the client device to prompt for completion of the account identifier.

In a further aspect, there is provided a non-transitory computer readable storage medium including processor-executable instructions which, when executed, configure a processor to perform a method described herein. For example, there may be provided a non-transitory computer readable storage medium comprising processor-executable instructions which, when executed, configure a processor to: send a first signal representing a message from a server computer system to a resource usage tracking server, the message including identification information for an entity; in response to the message, receive, from the resource usage tracking server, a second signal representing historical resource usage data for the entity; identify a first data transfer recipient associated with the historical resource usage data for the entity by using a database of supported data transfer recipients; send a third signal, the third signal causing a client device associated with the entity to display a selectable option for data transfer to the identified first data transfer recipient; receive a fourth signal, the fourth signal indicating selection of the selectable option for data transfer to the identified first data transfer recipient; and in response to receiving the fourth signal, configure an account associated with the entity based on the first data transfer recipient.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 (which may also be referred to as a server computer system) and a client device 150 communicate via a network 120. The client device 150 is a computing device that may be associated with an entity, such as a user or client, having resources associated with the server 160. For example, the server 160 may track, manage, maintain, and/or lend resources to the entity. The resources may, for example, be computing resources, such as memory or processor cycles. By way of further example, the resources may include stored value, such as fiat currency, which may be represented in a database. For example, the server 160 may be coupled to one or more databases 180, 190 which may be provided in secure storage. The secure storage may be provided internally within the server 160 or externally. The secure storage may, for example, be provided remotely from the server 160. For example, the secure storage may include one or more data centers. The data centers may, for example, store data with bank-grade security.

A first database 180 may include records for a plurality of accounts and at least some of the records may define a quantity of resources associated with an entity. For example, the entity that is associated with the client device 150 may be associated with an account having one or more records in the database. The records may reflect a quantity of stored resources that are associated with the entity. Such resources may include owned resources and, in at least some embodiments, borrowed resources (e.g., resources available on credit). The amount of resources that are available to or associated with an entity may be reflected by a balance defined in an associated record; for example a bank balance.

A record in the first database 180 may, for example, include data transfer recipient identification information. The data transfer recipient identification information may identify one or more data transfer recipients that the entity associated with the record has previously added to their account, to allow the data transfer recipient to receive data transfers from the record. For example, the data transfer recipient identification information may identify third parties such as previously configured bill payment recipients. The data transfer recipient identification information may identify such third parties by name. The data transfer recipient identification information may also include a customer identifier such as an account number. The customer identifier is a unique identifier used by an associated third party to identify the entity and/or an account that is maintained by the third party and that is associated with the entity. Techniques for adding new data transfer recipient to an entity account are described below.

The server 160 may be associated with a second database 190. The second database 190 may be a database of supported data transfer recipients. The supported data transfer recipients are data transfer recipients that are supported by the server 160. For example, the supported data transfer recipients may define data transfer recipients which may be added to an account associated with an entity to allow that entity to transfer resources to such data transfer recipients. The supported data transfer recipients may include at least some third parties that have not yet been added to an account but which may be so added if desired. By way of example, the supported data transfer recipients may include predefined bill payment recipients such as, for example, utilities, lenders, credit card companies, internet providers, wireless carriers, etc.

The server 160 may, for example, be a financial institution server and the entity may be a customer of a financial institution operating the financial institution server.

The client device 150 may be used, for example, to configure a data transfer from the account associated with the client device 150. More particularly, the client device 150 may be used to configure a data transfer from the account associated with an entity operating the client device 150. The data transfer may involve a transfer of data between a record in the database 180 associated with such an account and another record in the database 180 (or in another database such as a database associated with another server (not shown) which may be provided by another financial institution, for example, and which may be coupled to the server 160 via a network). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer whereas the record associated with the entity initiating the data transfer may be adjusted to reflect a decrease in value which is at least as large as the increase in value applied to the record associated with the data transfer recipient.

The server 160 may be in communication with a resource usage tracking server 170 via the network 120. The resource usage tracking server 170 may maintain a history of borrowing of resources by various entities including, for example, the entity associated with the client device 150 and associated with an account having one or more records in the database 180.

For example, the resource usage tracking server 170 may maintain historical resource usage data associated with the various entities. Such data may be maintained on a per-entity basis, with each entity having its own associated historical resource usage data. The historical resource usage data may identify, for example, third parties that have a credit relationship with the entity associated with a particular instance of the historical resource usage data, such as a particular record of the historical resource usage data. The historical resource usage data may, for example, be a credit report. A credit report is a record of a borrower's credit history from a number of sources including, for example, credit card companies, banks, collection agencies and/or governments. The historical resource usage data, such as the credit report, may identify various resource event data including, any one or a combination of: a borrowed resource history (such as a credit history), a resource transfer history (such as a record of payments including, for example, an indication of whether such payments were on time or late), failed transfer information (such as information regarding cheques that were returned for having non-sufficient funds and/or information about accounts that were sent to a collection agency, bureau or process due to non-transfer of resources), resource shortage information (such as data regarding prior bankruptcies or other data indicating that an entity had insufficient resources to satisfy data transfer requirements), borrowed resource information (such as information about loans including secured and unsecured loans), and/or data of another type.

At least some of the resource event data may include a third party identifier. The third party identifier may, for example, be a name of a third party that is associated with such data. For example, the name of a third party that added or caused to be added an entry to the historical resource usage data may be identified. By way of example, the resource transfer history may identify a plurality of third parties who have a past history of requesting and/or receiving transfers from the entity. By way of further example, the failed transfer information may identify a third party that was to be the recipient of the failed transfer. By way of further example, the borrowed resource information may identify a third party that previously lent resources to the entity.

At least some of the resource event data may include identification information that a defined third party associates with the entity. For example, an account number, a partial account number or other customer identifier may be included in the historical resource usage data. By way of example, the historical resource usage data may indicate that a given third party (e.g., "The Phone Company") identifies the entity with a defined account number (e.g., 798126).

The historical resource usage data may include other information instead of or in addition to the information defined above. For example, the historical resource usage data may include a listing of third parties that have previously retrieved and/or requested historical resource usage data maintained by the resource usage tracking server 170 (e.g., a listing of third parties that previously requested a credit report). By way of further example, the historical resource usage data may include identification and/or biographical information for the entity. Such information may include, for example, any one or more of: a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), or other information.

Various entries of data, such as, for example, the resource event data, may include a date associated therewith. The date may, for example, be a reporting and/or verification date. The date may reflect freshness of the associated entry of data such that entries with a more recent date may be considered to be fresher that entries with an older date.

The resource usage tracking server 170 may include an application programming interface (API) which allows the server 160 to request for and receive historical resource usage data for an entity. By way of example, the API may allow the server 160 to retrieve the historical resource usage data for an entity by sending a message which includes identification information for the entity to the resource usage tracking server 170. The identification information may, for example, include any one or combination of: a name, a government issued identification number, an address, a date of birth, contact information (e.g., a telephone number), or identification of another type. The resource usage tracking server 170 uses such identification information to retrieve a historical resource usage data associated with the entity. For example, an appropriate record in a database may be retrieved based on the identification information. The resource usage tracking server 170 may then send the historical resource usage data for the entity to the server 160.

The client device 150, the server 160 and the resource usage tracking server 170 may be in geographically disparate locations. Put differently, the client device 150 may be remote from the server 160 and the server 160 may be remote from the resource usage tracking server 170.

The client device 150, the server 160 and the resource usage tracking server 170 are computer systems. The client device 150 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the server 160 may provide both data transfer processing (e.g., bill payment) and data holding (e.g., banking) functions. That is, the server 160 may be both a financial institution server and also a bill payment processing server.

However, in other embodiments, such functions may be separated. For example, referring to FIG. 2, bill payment functions may be supported by a bill payment processing server 162 and data holding (and other account management functions) may be supported by a financial institution server 161. The financial institution server 161 may access and maintain the first database 180 whereas the bill payment processing server 162 may access and maintain the second database 190. The financial institution server 161 and the bill payment processing server 162 are server computer systems.

Figure 3:
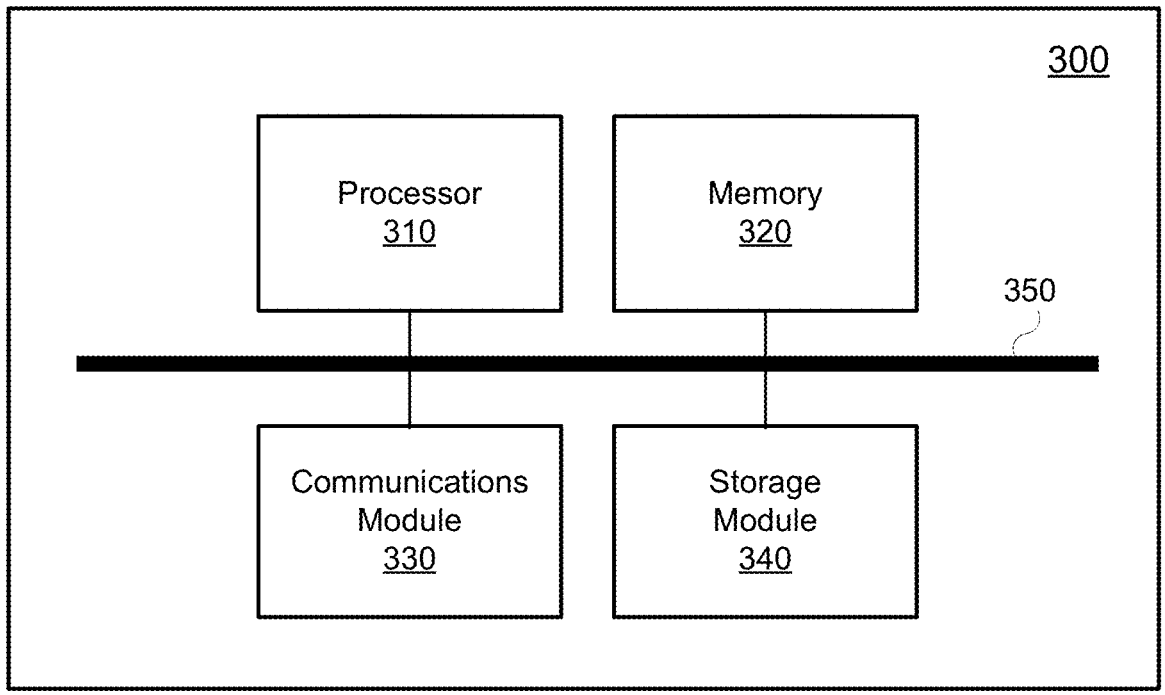
FIG. 3 is high-level schematic diagram of an example computing device.

The client device 150, the server 160, the financial institution server 161, the bill payment processing server 162, and the resource usage tracking server 170 are computing devices. Referring now to FIG. 3, a high-level operation diagram of an example computing device 300 will now be described. The example computing device 300 may be exemplary of the client device 150, the server 160, the financial institution server 161, the bill payment processing server 162, and the resource usage tracking server 170.

The example computing device 300 includes a variety of modules. For example, as illustrated, the example computing device 300 may include a processor 310, a memory 320, a communications module 330, and/or a storage module 340. As illustrated, the foregoing example modules of the example computing device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The communications module 330 allows the example computing device 300 to communicate with other computing devices and/or various communications networks. For example, the communications module 330 may allow the example computing device 300 to send or receive communications signals. Communications signals may be sent or received according to one or more protocols or according to one or more standards. For example, the communications module 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally or alternatively, the communications module 330 may allow the example computing device 300 to communicate using near-field communication (NFC), via Wi-Fi™, using Bluetooth™ or via some combination of one or more networks or protocols. In some embodiments, all or a portion of the communications module 330 may be integrated into a component of the example computing device 300. For example, the communications module may be integrated into a communications chipset.

The storage module 340 allows the example computing device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Where the example computing device 300 functions as the server 160, the financial institution server 161 or the bill payment processing server 162, the storage module 240 may allow the example computing device 200 to access the secure data in a database such as the first database 180 and/or the second database 190.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

The computing device 300 will include other components apart from those illustrated in FIG. 3 and the specific component set may differ based on whether the computing device 300 is operating as the client device 150, the server 160, the financial institution server 161, the bill payment processing server 162, or the resource usage tracking server 170. For example, the computing device 300 may include one or more input modules, which may be in communication with the processor 310 (e.g., over the bus 350). The input modules may take various forms including, for example, a mouse, a microphone, a camera, a touchscreen overlay, a button, a sensor, etc. By way of further example, the computing devices 300 may include one or more output modules, which may be in communication with the processor 310 (e.g., over the bus 350). The output modules include one or more display modules which may be of various types including, for example, liquid crystal displays (LCD), light emitting diode displays (LED), cathode ray tube (CRT) displays, etc. By way of further example, the output modules may include a speaker.

Figure 4:
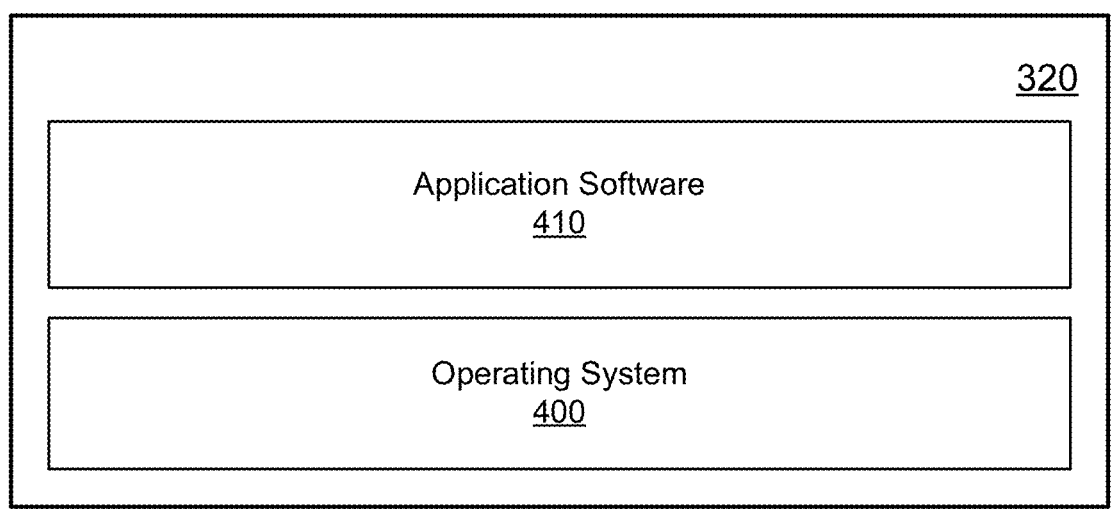
FIG. 4 shows a simplified organization of software components stored in a memory of the example computing device of FIG. 3.

FIG. 4 depicts a simplified organization of software components stored in the memory 320 of the example computing device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computing device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computing device 300, in combination with the operating system 400, to operate as a device performing a particular function. For example, the application 410 may cooperate with the operating system 400 to adapt a suitable embodiment of the example computing device 300 to operate as the client device 150, the server 160 the financial institution server 161, the bill payment processing server 162 and/or the resource usage tracking server 170.

While a single application 410 is illustrated in FIG. 4, in operation the memory 320 may include more than one application 410 and different applications 410 may perform different operations.

Figure 5:
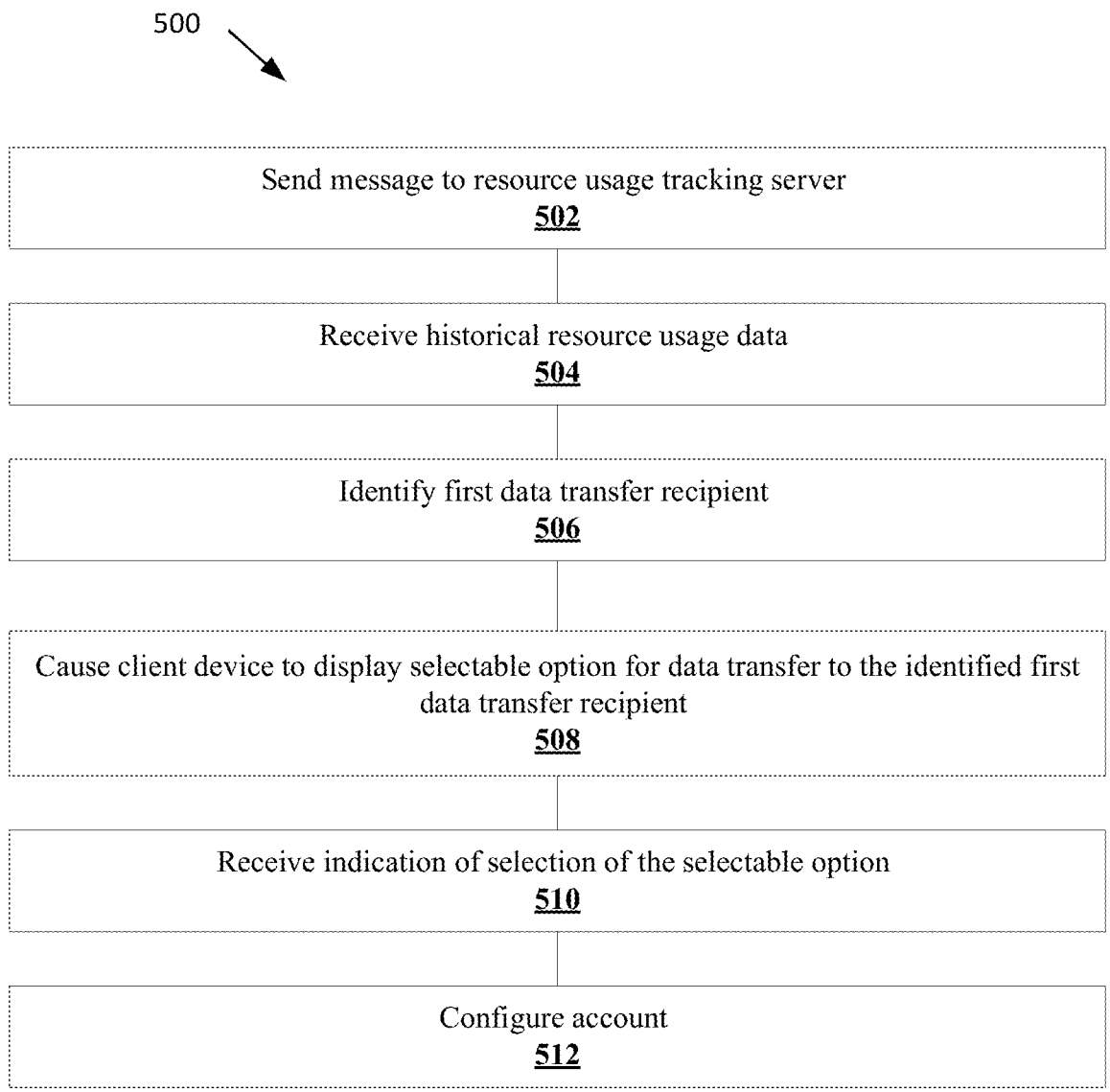
FIG. 5 is a flowchart of an example method in accordance with an example embodiment of the present disclosure.

Operations performed by a server computer system, such as the server 160 of FIG. 1 or the bill payment processing server 162 of FIG. 2, will be described below with reference to FIGS. 5 to 9. Referring first to FIG. 5, a flowchart showing example operations is illustrated.

Figure 2:
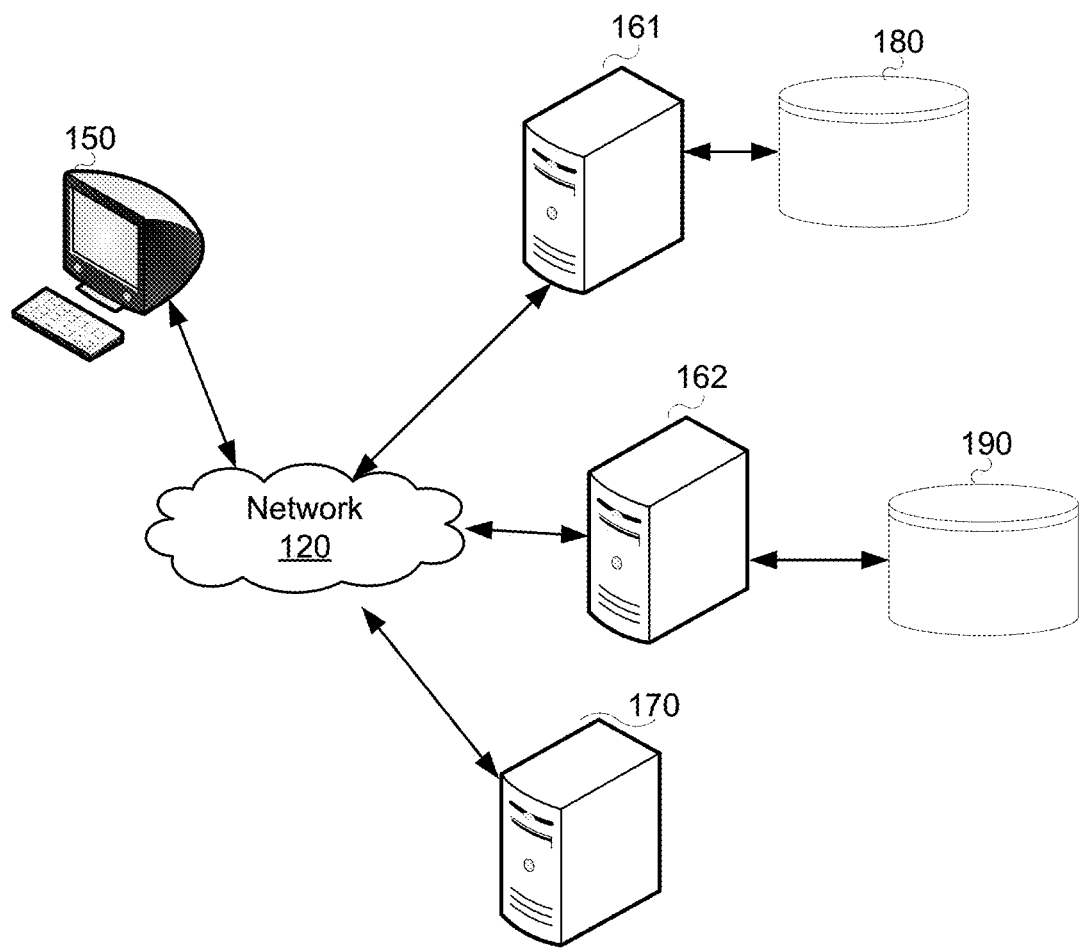
FIG. 2 is a schematic operation diagram illustrating an operating environment of an further example embodiment.

The flowchart of FIG. 5 shows operations performed by a server (e.g., the server 160 of FIG. 1 or the bill payment processing server 162 of FIG. 2). The operations may be included in a method 500 which may be performed by the server. For example, computer-executable instructions stored in memory of the server may, when executed by a processor of the server, configure the server to perform the method 500 or a portion thereof.

Figure 6:
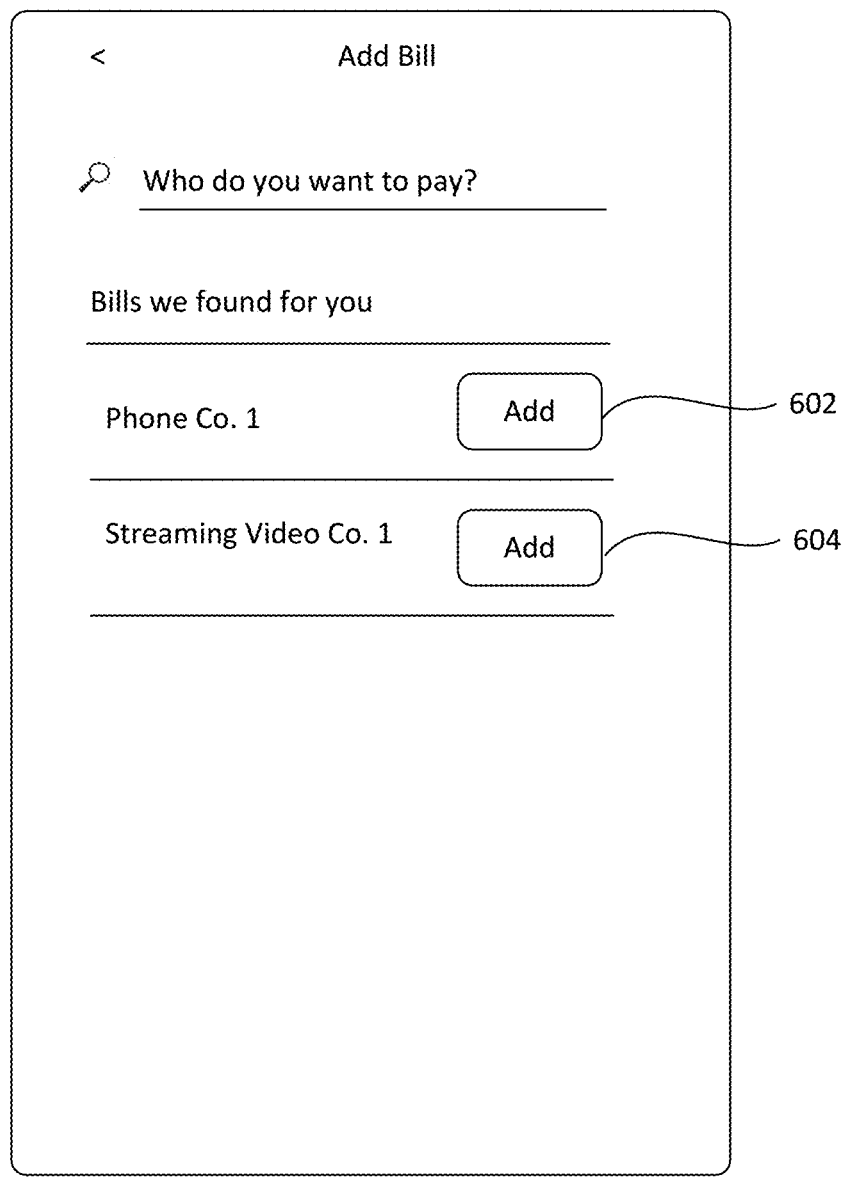
FIG. 6 is an example display screen of an interface in accordance with an example embodiment.

The method 500 may be initiated, for example, when a client device 150 associated with an entity requests, from a server (such as the server 160 of FIG. 1 or the financial institution server 161 or bill payment processing server 162 of FIG. 2, a user interface for adding a data transfer recipient (e.g, an "add bill" user interface). An example of one such user interface is illustrated in FIG. 6 and, in response to the request for the user interface, the server may perform the method 500. The method may, therefore, be performed by the server is response to receipt of a request for the user interface for adding a data transfer recipient.

At operation 502, the method 500 includes sending, via the communications module, a first signal representing a message from the server computer system to a resource usage tracking server 170. The message includes identification information for an entity. The identification information may, for example, include any one or combination of: a name, government issued identification number, an address, a date of birth, contact information (e.g., a telephone number), or identification of another type. The message may be sent via an API call to the resource usage tracking server 170.

The resource usage tracking server 170 uses the identification information to retrieve historical resource usage data for the entity represented by the identification information. For example, the identification information may be used as part of a database query to retrieve associated historical resource usage data. The resource usage tracking server 170 then sends such historical resource usage data to the server performing the method 500. Accordingly, at operation 504 the method includes, in response to the message, receiving, via the communications module and from the resource usage tracking server, a second signal representing historical resource usage data for the entity.

The historical resource usage data may be of the type described above with reference to FIGS. 1 and 2. By way of example, the resource usage tracking server 170 may be a credit report server and the historical resource usage data may represent a credit report.

Next, at operation 506, the method 500 includes identifying a first data transfer recipient associated with the historical resource usage data for the entity by using a database of supported data transfer recipients. That is, the server performing the method may attempt to identify third parties that are both supported data recipients and that are included in the historical resource usage data. Searching, matching and/or or querying operations may be performed during operation 506. By way of example, a third party may be extracted from the historical resource usage data and may be used in a query of the database of supported data transfer recipients to determine whether the extracted third party is a supported data transfer recipient. By way of further example, during operation 506 a supported data transfer recipient (i.e., a data transfer recipient included in the database of supported data transfer recipients) may be used to search the historical resource usage data to determine whether the supported data transfer recipient is included in the historical resource usage data.

The matching functions that are used in order to identify a supported data transfer recipient that corresponds to a data transfer recipient in the historical resource usage data may be configured to account for variations in a name of a data transfer recipient. For example, the matching functions may not require exact matches; for example, terms that are included in a defined "ignore" list may be excluded (e.g. the list may include: Company, Ltd., Co., Inc., etc.). By way of further example, the matching may permit some character variations due to possible typographical errors. For example, "ABC communications" could be considered to be a match for "ABC communication" or "ABC cmmunication".

Furthermore, in order to allow for real-time searching, the searching/matching may not consider all possible supported data transfer recipients. Rather, a subset of supported data transfer recipients may be considered. The subset may represent commonly used data transfer recipients for other users of the server. The subset may not be the same for all entities. For example, the subset may be selected based on a geographic location associated with the entity. By way of example, a user located in Canada may have a different subset than a user located in the United States since common data transfer recipients (e.g., common bill payment recipients) may be different in Canada than in the United States.

The subset of data transfer recipients that is used for the matching functions in operation 506 may also be filtered to exclude one or more supported data transfer recipients that correspond to data transfer recipients already added by the entity. For example, if a user previously added ABC Communications as a data transfer recipient for that user's account, then ABC Communications may be excluded from the matching functions by filtering ABC communications from the subset of data transfer recipients used for the matching functions. Filtering may also be performed categorically to, for example, filter the subset to exclude a data transfer recipient of a same category as a data transfer recipient already added by the entity. For example, if the user previously added a wireless communications provider as a data transfer recipient for the user's account then supported data transfer recipients that are categorized as being wireless communications providers may be excluded from the subset.

By way of further example, the server performing the method may also use category information for existing data transfer recipients (e.g., payees) to help resolve at least some ambiguities. For example, the server may determine that a data transfer recipient of a certain category (e.g., cell phone) is already setup for the user and that a proposed data transfer recipient is unlikely to be in that same category. The server may, however, check for indicia that may suggest that the customer has ceased using the previously configured data transfer recipient before categorically excluding a data transfer recipient. For example, if a cell phone payee is already setup but the user has recently updated their address (suggesting a possible move) or has not made a payment to that payee in a while, then a proposed cell phone provider payee may not be categorically excluded.

In at least some embodiments, during operation 506 more common supported data transfer recipients may be considered before less common supported data transfer recipients are considered. That is, for the purpose of matching, the server may prioritize supported data transfer recipients that are more commonly used by other entities ahead of supported data transfer recipients that are used more seldom.

The database of supported data transfer recipients that is used at operation 506 may be the database 190 of FIG. 1 or 2.

When a match is identified at operation 506 (i.e., when a data transfer recipient is both supported and reflected in the historical resource usage data), the identified data transfer recipient may be used in a recommendation presented to the entity. For example, at operation 508, the server may send, via the communications module, a third signal. The third signal causes a client device 150 associated with the entity to display or otherwise provide a selectable option for data transfer to the identified first data transfer recipient. The selectable option may provide a recommendation or a suggestion to add the identified data transfer recipient.

By way of example, referring briefly to FIG. 6, an example display screen is illustrated. The example display screen is a user interface for adding a data transfer recipient. The example display screen includes a selectable option 602 to add a first data transfer recipient and a selectable option 604 to add a second data transfer recipient. The example display screen also includes a search field for searching for a data transfer recipient that may not be the first data transfer recipient or the second data transfer recipient.

The first data transfer recipient is the data transfer recipient identified at operation 506 of the method 500. The second data transfer recipient may also be identified during operation 506 or during another similar operation.

The third signal that is sent at operation 508 may, in some embodiments, be sent directly to the client device 150 from the server performing the method. For example, when the server performing the method is the server 160 of FIG. 1 which acts as both the financial institution server and the bill payment processing server, then the third signal may be sent from the server 160 to the client device 150. For example, a user interface may be sent the third signal. The user interface may be of the type described with reference to FIG. 6.

In other embodiments, such as in at least some implementations of the type described with reference to FIG. 2 in which the financial institution server 161 exists apart from the bill payment processing server 162, the third signal may be sent from the bill payment processing server 162 to the financial institution server 161. Upon receiving the third signal, the financial institution server 161 may then provide a further signal to the client device to cause the client device to display the selectable option for data transfer to the identified first data transfer recipient. For example, the financial institution server 161 may send a user interface to the client device 150. The user interface may be of the type described with reference to FIG. 6.

Conveniently, the third signal that is sent at operation 508 may be provided in real-time in response to receipt of the first signal. Since the server is a computer system, the matching of operation 506 may be performed in real-time and the server may instantly cause the selectable option to be provided on the client device 150. For example, a user may, on the client device, request a user interface for adding a data transfer recipient (e.g., an "add bill" user interface) to initiate the method 500. After doing so, the client device may be updated, in real time, with an interface of the type described above with reference to FIG. 6. That is, a recommended data transfer recipient may immediately be provided. This may allow the recommendation to be provided before a user has a chance to begin inputting search criteria into a search interface.

The selectable option for data transfer to the identified first data transfer recipient may represent an option to add the identified first data transfer recipient as a pre-configured data transfer recipient to allow the data transfer recipient to be selected for a data transfer.

If the client device 150 receives a selection of the selectable option 602, the client device sends, to the server performing the method 500 an indication of such selection.

The indication may be sent directly to the server performing the method or may be sent via an intermediary. For example, the client device 150 may send an indication to the financial institution server 161 which may then send a corresponding indication to the bill payment processing server 162. In either case, the server performing the method 500 may, at operation 510, receive, via the communications module, a fourth signal. The fourth signal indicates selection of the selectable option for data transfer to the identified first data transfer recipient. The server may then, at operation 512, in response to receiving the fourth signal, configure an account associated with the entity based on the first data transfer recipient. That is, the server may add the identified first data transfer recipient as a pre-configured data transfer recipient for an account associated with the entity to allow the data transfer recipient to be selected for a data transfer. Accordingly, at operation 512 the server may configure the account associated with the entity based on the data transfer recipient by updating the account to permit the first data transfer recipient to be selected for receiving data transfers from the account.

Figure 7:
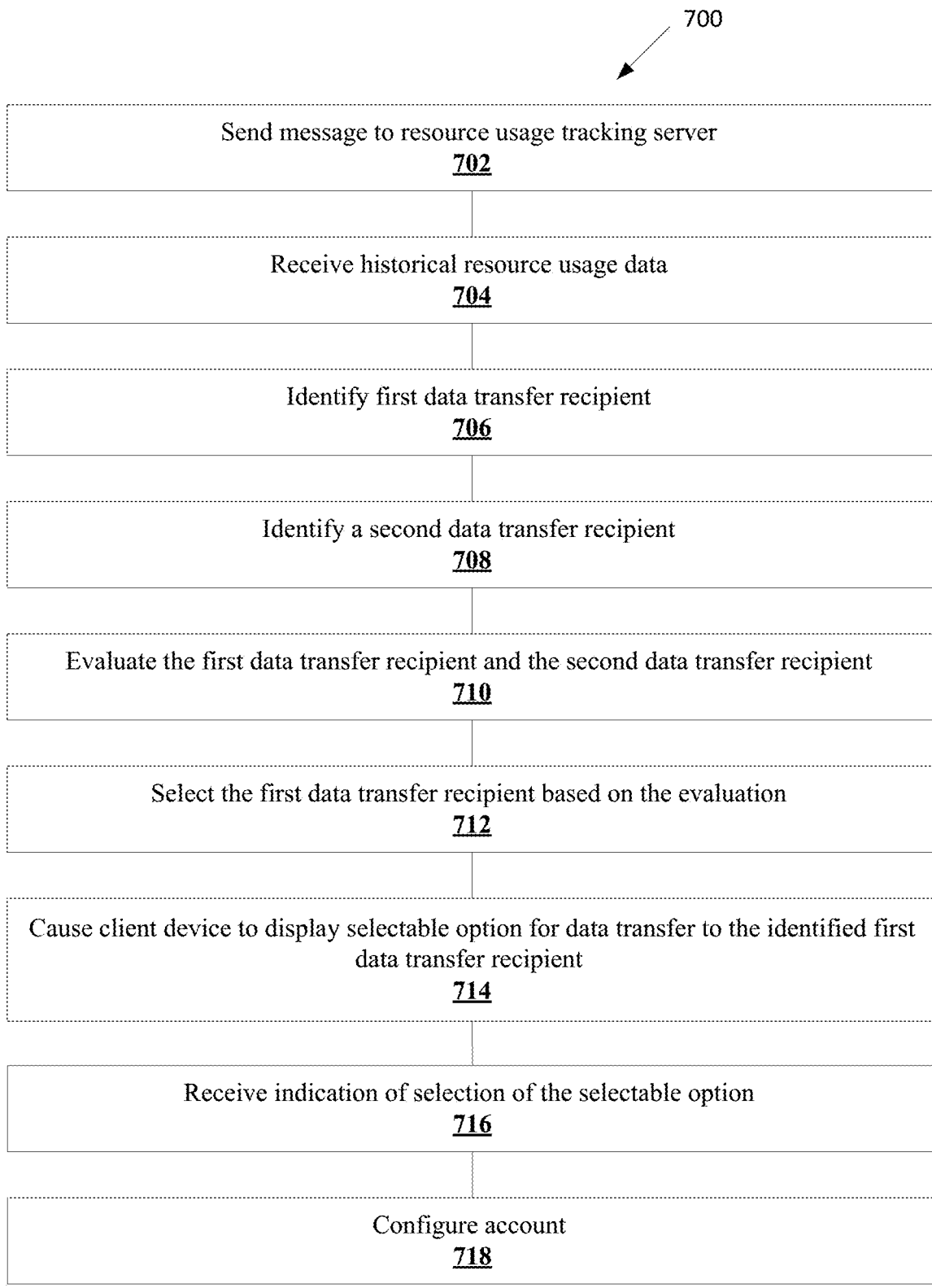
FIG. 7 is a flowchart of an example method in accordance with an example embodiment of the present disclosure.

Referring now to FIG. 7, a flowchart showing example operations of a further method 700 is illustrated. The flowchart of FIG. 7 shows operations performed by a server (e.g., the server 160 of FIG. 1 or the bill payment processing server 162 of FIG. 2). The operations may be included in a method 700 which may be performed by the server. For example, computer-executable instructions stored in memory of the server may, when executed by a processor of the server, configure the server to perform the method 700 or a portion thereof.

The method 700 may be initiated in the same manner by which the method 500 of FIG. 5 is initiated; for example, when a client device 150 associated with an entity requests, from a server, such as the server 160 of FIG. 1 or the financial institution server 161 or bill payment processing server 162 of FIG. 2, a user interface for adding a data transfer recipient (e.g, an "add bill" user interface).

Operations 702, 704 and 706 of the method 700 may be performed in the same manner as operations 502, 504 and 506 of the method 500 respectively.

At operation 708, the method 700 includes identifying a second data transfer recipient associated with the historical resource usage data for the entity by using the database of supported data transfer recipients. Operation 708 may be performed similar to and/or together with operation 706. For example, a given entity listed in the historical resource usage data may match multiple supported data transfer recipients. In this example, a particular entity in the historical resource usage data may match both a first data transfer recipient that is supported and a second data transfer recipient that is also supported. Such an ambiguity may occur, for example, where the matching algorithm does not require a direct match or where there are two supported data transfer recipients having the same name. By way of example, the historical resource usage data may list an entity "ABC" and there the historical resource usage data may list both "ABC communications" and "ABC auto lending". In at least some embodiments, subsequent operations may be performed to resolve the ambiguity.

For example, at operation 710, the method 700 may include evaluating the first data transfer recipient and the second data transfer recipient and at operation 712, the method 700 may include selecting one of the identified data transfer recipients based on the evaluating. For example, the first data transfer recipient may be selected in at least some embodiments.

The evaluating may be performed based on other data associated with the entity or with other entities. For example, the server may evaluate the data transfer recipients by determining a most commonly used one of the data transfer recipients. Such evaluation may consider which of the identified data transfer recipients has been added by more entities. When the first data transfer recipient has been added as a pre-configured data transfer recipient by more entities than the second data transfer recipient, the first data transfer recipient may be selected. For example, if more entities have added ABC communications than have added ABC auto lending, then ABC communications may be selected.

Other factors or criteria may be used in the evaluation to resolve the ambiguity. For example, evaluating the first data transfer recipient and the second data transfer recipient may include evaluating the first data transfer recipient and the second data transfer recipient based on a location associated with the entity. By way of example, the server may determine, based on stored data, whether the first data transfer recipient and the second data transfer recipient are associated with a location associated with the entity. For example, if the first data transfer recipient is found to operate in a location associated with the entity but the second data transfer recipient does not operate in such a location, then the first data transfer recipient may be selected. By way of example, if the entity is located in Canada and ABC communications operates in Canada and ABC auto financing operates only in the United States, then ABC communications may be selected.

In some embodiments, evaluating the first data transfer recipient and the second data transfer recipient may include evaluating the first data transfer recipient and the second data transfer recipient based on category data associated with one or both of the first data transfer recipient and the second data transfer recipient. For example, evaluating the first data transfer recipient and the second data transfer recipient based on category data may include determining that the account associated with the entity has previously been configured based on a third data transfer recipient associated with a category that is also associated with the second data transfer recipient. When the evaluating indicates that a data transfer recipient of the same category as the second data transfer recipient has already been added, then the first data transfer recipient may be selected. For example if ABC communications is a wireless communications provider and ABC auto finance is a vehicle financing company and if the user has already added another auto financing company as a pre-configured data transfer recipient but has not already added another wireless communications provider, then ABC communications may be selected.

The evaluation and/or selection at operations 710 and 712 may consider a plurality of factors or criteria. For example, any combination of location, category and commonness may be evaluated.

After a data transfer recipient is selected, operations 714 and 718 may then be performed. Such operations correspond to operations 508 to 512 of the method 500 of FIG. 5 respectively. In the example method illustrated, the first data transfer recipient is selected and so the selectable option is an option to add the first data transfer recipient as a pre-configured data transfer recipient.

Figure 8:
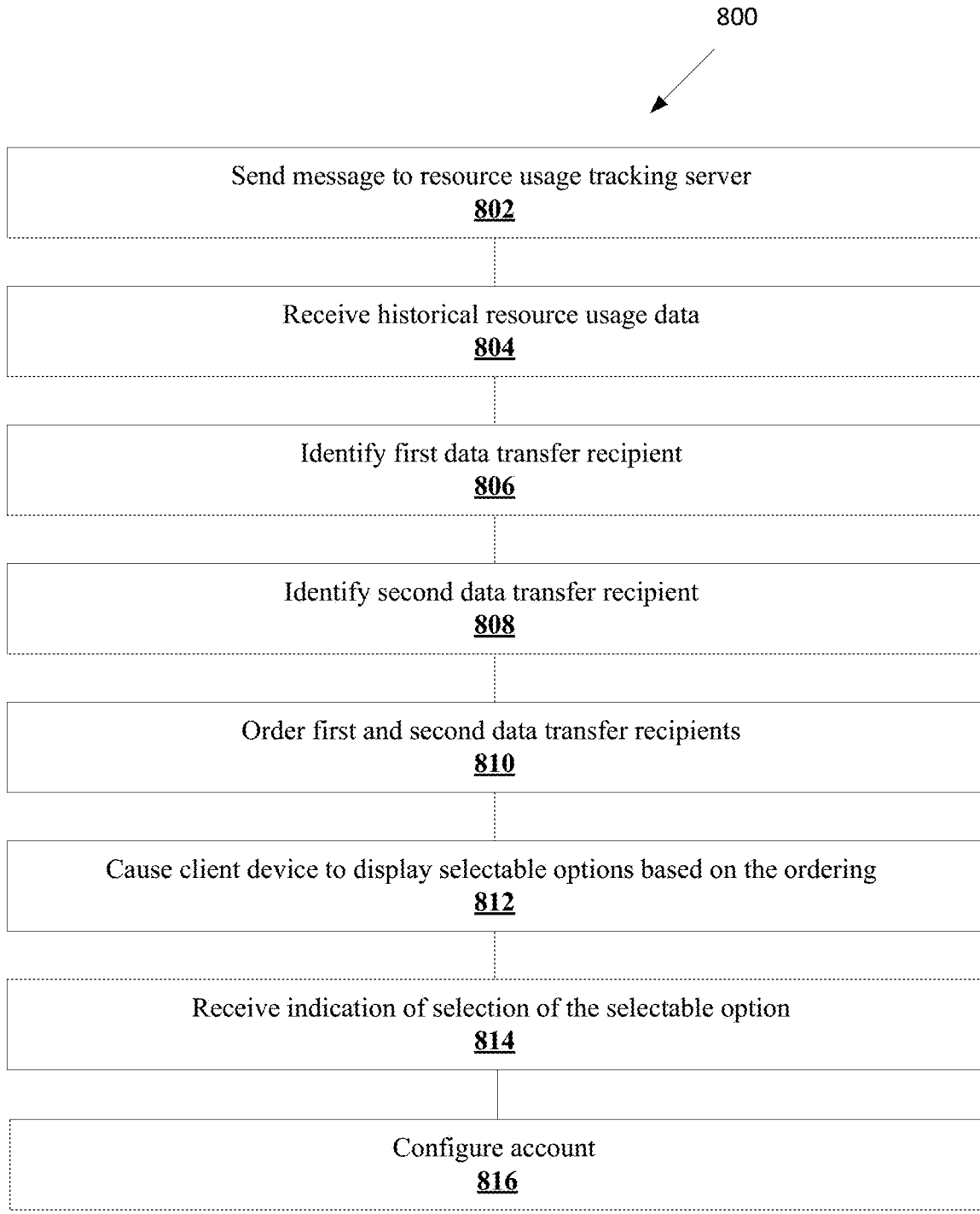
FIG. 8 is a flowchart of an example method in accordance with an example embodiment of the present disclosure.

In some instances, the server may provide more than one suggestion or recommendation for adding a data transfer recipient. Referring now to FIG. 8, a flowchart showing example operations of a further method 800 is illustrated. The flowchart of FIG. 8 shows operations performed by a server (e.g., the server 160 of FIG. 1 or the bill payment processing server 162 of FIG. 2). The operations may be included in a method 800 which may be performed by the server. For example, computer-executable instructions stored in memory of the server may, when executed by a processor of the server, configure the server to perform the method 800 or a portion thereof.

The method 800 may be initiated in the same manner by which the method 500 of FIG. 5 is initiated; for example, when a client device 150 associated with an entity requests, from a server, such as the server 160 of FIG. 1 or the financial institution server 161 or bill payment processing server 162 of FIG. 2, a user interface for adding a data transfer recipient (e.g., an "add bill" user interface).

Since the historical resource usage data may specify multiple third parties, the server may offer more than one recommended data transfer recipient to be added. For example, as illustrated in FIG. 6, a display screen may include a first selectable option 602 to add a first data transfer recipient and a second selectable option 604 to add a second data transfer recipient. The method 800 may be performed to provide such a display screen.

Operations 802, 804 and 806 of the method 800 may be performed in the same manner as operations 502, 504 and 506 of the method 500 respectively. At operation 806, a first data transfer recipient may be identified based on a first third party identified in the historical resource usage data. Operation 806 may be performed in the same manner as operation 506. Similarly, at operation 808, a second data transfer recipient may be identified based on a second third party identified in the historical resource usage data. Operation 808 may be performed in the same manner as operation 806 but it is performed based on a different third party identified in the historical resource usage data. For example, the historical resource data may identify a first third party, ABC, and a second third party, XYZ, and operation 806 may be performed based on the first third party, ABC, whereas operation 808 may be performed based on the second third party, XYZ.

Having identified more than one supported data transfer recipient represented by the historical resource usage data, the server may then, at operation 810, order such identified data transfer recipients. The ordering may be performed, for example, based on any one or more of: dates associated with the data transfer recipients in the historical resource data (e.g., third parties that were recently added to the historical resource usage data may be ordered relatively higher than third parties that were added a long time ago), locations of the identified data transfer recipients (e.g., if the location of the data transfer recipient corresponds to that of the entity, then the order may be relatively higher than if the locations do not match), categories associated with the identified data transfer recipients (e.g., if a category for the data transfer recipient is the same as the category of a previously added data transfer recipient for the entity then the order for that data transfer recipient may be relatively lower than if the category is not the same), and/or a measure of commonness for the data transfer recipients as determined from other entity accounts (e.g., a data transfer recipient that is added for a lot of accounts may be ordered higher than a data transfer recipient that is seldom used for other accounts). Other criteria may also be used instead of or in addition to the criteria described herein.

At operation 812, the server may send, via the communications module, a third signal. The third signal causes a client device 150 associated with the entity to display or otherwise provide a selectable option for data transfer to the identified first data transfer recipient and also a selectable option for data transfer to the identified second data transfer recipient. The selectable options are ordered in accordance with the ordering determined in operation 810. For example, where a display screen of the type illustrated in FIG. 6 is displayed, "Phone Co. 1" may have been ordered higher than "Streaming Video Co. 1" and so "Phone Co. 1" is displayed higher or more prominently than "Streaming Video Co. 1". Operation 812 is similar to operation 508 of the method 500 but the ordering of the selectable options provided in operation 812 is based on the determined order.

Operations 814 and 816 correspond to operations 510 and 512 of the method 500 respectively and may be performed in the same or in a similar manner.

When adding a new data transfer recipient using a selectable option 602, 604 provided on a display screen of a client device 150, additional information may be required. For example, the data transfer recipient may rely on a customer identifier, such as an account number, which corresponds to the entity. This customer identifier may be provided to the data transfer recipient when data transfers made to the data transfer recipient so that the data transfer recipient is able to determine the source of the data transferred. For example, where the data transfer is a bill payment in which value is debited from a record of an account for the entity and value is credited to a record of an account for the data transfer recipient, the customer identifier allows the data transfer recipient to identify which of the many possible entities that are customers is associated with the transfer.

The server may cooperate with the client device to obtain the account number after one of the selectable options 602, 604 is selected. For example, after a selectable option 602, 604 to add a data transfer recipient is selected, the client device 150 may display a display screen that prompts for input of a customer identifier.

In some embodiments, to facilitate input of the customer identifier (also referred to as an account identifier) and avoid possible erroneous input, the server may automatically identify the customer number or a portion thereof from the historical resource usage data. One such embodiment will now be described.

Figure 9:
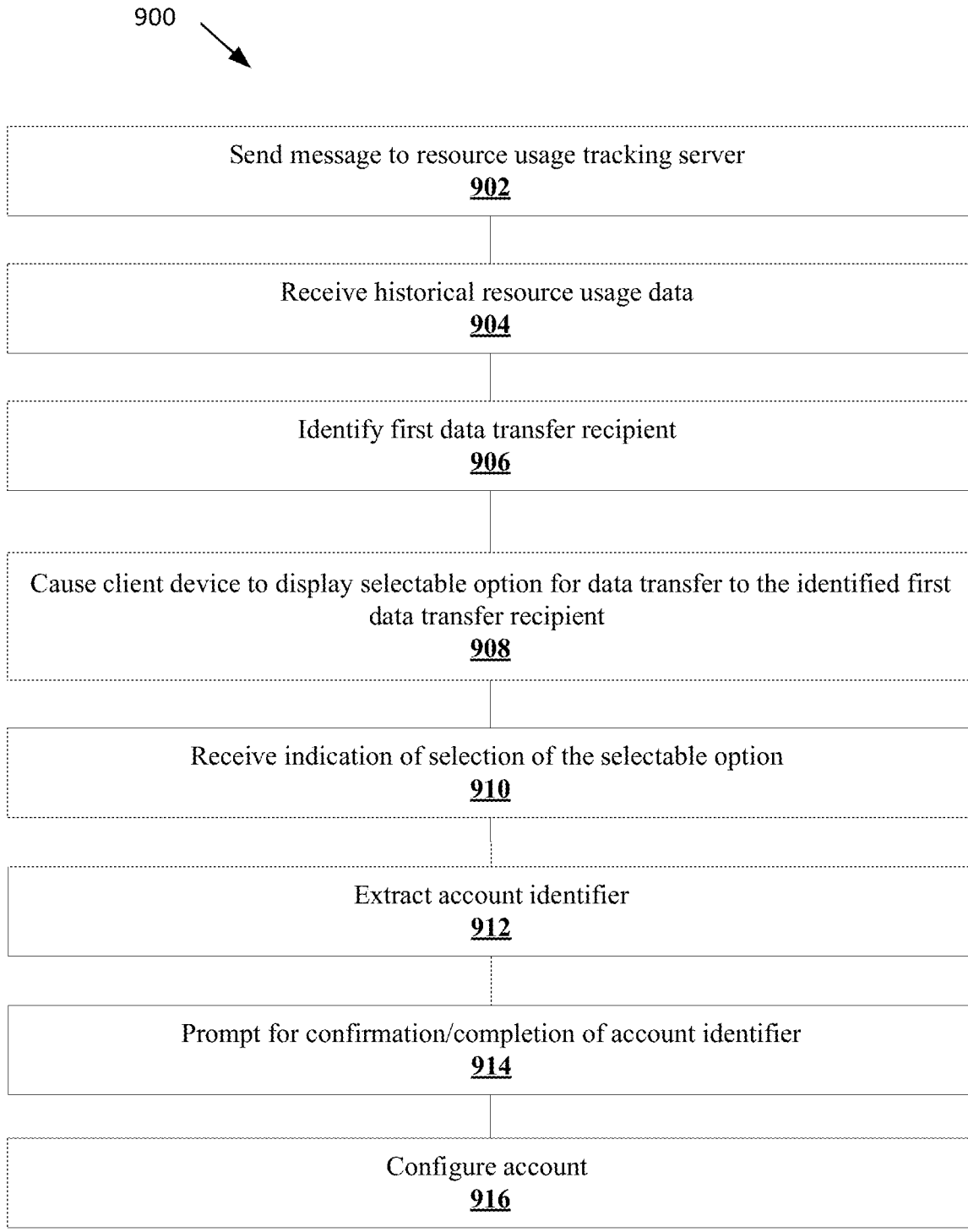
FIG. 9 is a flowchart of an example method in accordance with an example embodiment of the present disclosure.

Referring now to FIG. 9, a flowchart showing example operations of a further method 900 is illustrated. The flowchart of FIG. 9 shows operations performed by a server (e.g., the server 160 of FIG. 1 or the bill payment processing server 162 of FIG. 2). The operations may be included in a method 900 which may be performed by the server. For example, computer-executable instructions stored in memory of the server may, when executed by a processor of the server, configure the server to perform the method 900 or a portion thereof.

The method 900 may be initiated in the same manner by which the method 500 of FIG. 5 is initiated; for example, when a client device 150 associated with an entity requests, from a server, such as the server 160 of FIG. 1 or the financial institution server 161 or bill payment processing server 162 of FIG. 2, a user interface for adding a data transfer recipient (e.g., an "add bill" user interface).

Operations 902 to 910 of the method 900 correspond to operations 502 to 510 of the method 500 and may be performed in the same or in a similar manner.

At operation 912, the method includes extracting an account identifier that identifies an account at the first data transfer recipient from the historical resource usage data. For example, the historical resource usage data may specify a full or partial account identifier for a given third party and, at operation 912, the identifier for the third party that is associated with the selectable option that was selected is identified from the historical resource usage data. By way of example, if a selectable option 602 to add "Phone Co. 1" is selected, then the server may identify an account identifier associated with the Phone Co. 1 entry in the historical resource usage data.

Next, at operation 914, the method may include prompting for completion and/or confirmation of the account identifier. For example, the server may send a signal which causes the client device to display the extracted account identifier and which prompts for confirmation of such an identifier. The displayed extracted account identifier may be editable through an input interface of the client device. For example, if the extracted account identifier is incorrect, the user may override the extracted account identifier by inputting a modified account identifier. In some instances the historical resource usage data may not include a complete account identifier. For example, the historical resource usage data may include a partial identifier (e.g., it may only include the first 4 digits of the account number). The prompt may, in at least some such embodiments, request completion of the partial identifier.

Operation 916 may be performed in the same or similar manner as operation 512 of the method 500 of FIG. 5. During operation 916, an account may be configured based on the account identifier so that data transfers to the data transfer recipient being added will reference the account identifier.

While the methods 700, 800 and 900 describe variations of the method 500, it will be understood that the operations described with respect to these various methods could be combined. For example, a method may include the operations that resolve ambiguities as described with reference to FIG. 7, the ordering operations of FIG. 8 and/or the account identifier determination operations of FIG. 9.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc As noted, certain adaptations and modifications of the described embodiments can be made. Therefore, the above discussed embodiments are considered to be illustrative and not restrictive.

What is claimed is:

1. A server computer system comprising:
a communications device;
a processor coupled to the communications device; and
a memory storing processor-executable instructions which, when executed, configure the processor to:
send, via the communications device, a message from the server computer system to a resource usage tracking server, the message including identification information for an entity;
in response to the message, receive, via the communications device and from the resource usage tracking server, historical resource usage data for the entity;
identify a first data transfer recipient associated with the historical resource usage data for the entity by using a database of supported data transfer recipients;
identify a second data transfer recipient associated with the historical resource usage data for the entity by using the database of supported data transfer recipients;
perform an evaluation of the first data transfer recipient and the second data transfer recipient based on category data associated with at least one of the first data transfer recipient and the second data transfer recipient, the evaluation including determining that an account has previously been configured based on a third data transfer recipient associated with a category that is also associated with the second data transfer recipient;
select the first data transfer recipient based on the evaluation;
send, via the communications device, a message, the message causing a client device associated with the entity to display a selectable option for data transfer to the identified first data transfer recipient;
receive, via the communications device an indication of a selection of the selectable option for data transfer to the identified first data transfer recipient; and
in response to receiving the indication of the selection of the selectable option for data transfer to the identified first data transfer recipient, configure the account associated with the entity based on the first data transfer recipient.

2. The server computer system of claim 1, wherein the selectable option for data transfer to the identified first data transfer recipient represents an option to add the identified first data transfer recipient as a pre-configured data transfer recipient and wherein configuring the account associated with the entity based on the data transfer recipient comprises updating the account to permit the first data transfer recipient to be selected for receiving data transfers from the account.

3. The server computer system of claim 1, wherein evaluating the first data transfer recipient and the second data transfer recipient comprises evaluating the first data transfer recipient and the second data transfer recipient based on a location associated with the entity.

4. The server computer system of claim 1, wherein the message that causes the client device associated with the entity to display a selectable option is provided in real-time in response to receipt of the historical resource usage data for the entity.

5. The server computer system of claim 1, wherein the instructions further configure the processor to:
extract an account identifier that identifies an account at the first data transfer recipient from the historical resource usage data,
and wherein configuring the account associated with the entity based on the first data transfer recipient comprises configuring the account based on the account identifier.

6. The server computer system of claim 5, wherein the account identifier includes a partial identifier and wherein the instructions further configure the processor to:
cause the client device to prompt for completion of the account identifier.

7. The server computer system of claim 1, wherein the resource usage tracking server includes a credit report server and wherein the historical resource usage data represents a credit report.

8. A method performed at a server, the method comprising:
sending a message from a server computer system to a resource usage tracking server, the message including identification information for an entity;
in response to the message, receiving, from the resource usage tracking server, historical resource usage data for the entity;
identifying a first data transfer recipient associated with the historical resource usage data for the entity by using a database of supported data transfer recipients;
identifying a second data transfer recipient associated with the historical resource usage data for the entity by using the database of supported data transfer recipients;
performing an evaluation of the first data transfer recipient and the second data transfer recipient based on category data associated with at least one of the first data transfer recipient and the second data transfer recipient, the evaluation including determining that an account has previously been configured based on a third data transfer recipient associated with a category that is also associated with the second data transfer recipient;
selecting the first data transfer recipient based on the evaluation;
sending a message causing a client device associated with the entity to display a selectable option for data transfer to the identified first data transfer recipient;
receiving an indication of a selection of the selectable option for data transfer to the identified first data transfer recipient; and
in response to receiving the indication of a selection of the selectable option for data transfer to the identified first data transfer recipient, configuring an account associated with the entity based on the first data transfer recipient.

9. The method of claim 8, wherein the selectable option for data transfer to the identified first data transfer recipient represents an option to add the identified first data transfer recipient as a pre-configured data transfer recipient and wherein configuring the account associated with the entity based on the data transfer recipient comprises updating the account to permit the first data transfer recipient to be selected for receiving data transfers from the account.

10. The method of claim 8, wherein evaluating the first data transfer recipient and the second data transfer recipient comprises evaluating the first data transfer recipient and the second data transfer recipient based on a location associated with the entity.

11. The method of claim 8, wherein the message causing a client device associated with the entity to display a selectable option for data transfer to the identified first data transfer recipient provided in real-time in response to receipt of the historical resource usage data for the entity.

12. The method of claim 8, further comprising:
extracting an account identifier that identifies an account at the first data transfer recipient from the historical resource usage data,
and wherein configuring the account associated with the entity based on the first data transfer recipient comprises configuring the account based on the account identifier.

13. The method of claim 12, wherein the account identifier is a partial identifier and wherein the method further comprises:
causing the client device to prompt for completion of the account identifier.

14. A non-transitory computer readable storage medium comprising processor-executable instructions which, when executed, configure a processor to:
send a message from a server computer system to a resource usage tracking server, the message including identification information for an entity;
in response to the message, receive, from the resource usage tracking server, a historical resource usage data for the entity;
identify a first data transfer recipient associated with the historical resource usage data for the entity by using a database of supported data transfer recipients;
identify a second data transfer recipient associated with the historical resource usage data for the entity by using the database of supported data transfer recipients;
perform an evaluation of the first data transfer recipient and the second data transfer recipient based on category data associated with at least one of the first data transfer recipient and the second data transfer recipient, the evaluation including determining that an account has previously been configured based on a third data transfer recipient associated with a category that is also associated with the second data transfer recipient;
select the first data transfer recipient based on the evaluation;
send a message causing a client device associated with the entity to display a selectable option for data transfer to the identified first data transfer recipient;
receive an indication of a selection of the selectable option for data transfer to the identified first data transfer recipient; and
in response to receiving the indication of the selection of the selectable option for data transfer to the identified first data transfer recipient, configure an account associated with the entity based on the first data transfer recipient.

* * * * *